United States Patent [19]

Rzeszewski

[11] Patent Number: 4,630,099

[45] Date of Patent: Dec. 16, 1986

[54] TIME MULTIPLEXING CHROMINANCE INFORMATION FOR COMPATIBLE HIGH-DEFINITION TELEVISION

[75] Inventor: Theodore S. Rzeszewski, Lombard, Ill.

[73] Assignee: AT&T Bell Laboratories, Murray Hill, N.J.

[21] Appl. No.: 571,183

[22] Filed: Jan. 16, 1984

[51] Int. Cl.[4] ............................................ H04N 11/06
[52] U.S. Cl. ....................................... 358/12; 358/11
[58] Field of Search ........................ 358/11, 12, 14, 16

[56] References Cited

U.S. PATENT DOCUMENTS

| | | | |
|---|---|---|---|
| 2,686,831 | 8/1954 | Dome | 358/141 |
| 3,617,626 | 11/1969 | Bluth | 178/6.6 A |
| 4,084,181 | 4/1978 | Mita et al. | 358/12 |
| 4,296,431 | 10/1981 | Holland | 358/12 |
| 4,300,161 | 11/1981 | Haskell | 359/142 |
| 4,476,484 | 10/1984 | Haskell | 358/11 |
| 4,485,401 | 11/1984 | Tan et al. | 358/12 X |
| 4,521,803 | 6/1985 | Gittinger | 358/12 |
| 4,567,508 | 1/1986 | Hulyer | 358/11 |
| 4,581,640 | 4/1986 | Cole | 358/12 X |

OTHER PUBLICATIONS

"Signal Processing for Compatible HDTV—Systems, First Results," B. Wendland, Universitat Dortmund, HDTV Colloquim sponsored by Canadian Government, Ottawa, Canada, Oct. 18-21, 1982, pp. 2.3-1-2.-3-10.
T. S. Rzeszewski, "A Compatible High-Definition Television System", Bell System Technical Journal, vol. 62, No. 7, Sep. 1983, pp. 2091-2111.
"Networking Aspects of High Definition Television," Arpad G. Toth, Bell—Northern Research, HDTV Colloqium sponsored by Canadian Government, Ottawa, Canada, Oct. 18-21, 1982, pp. 2.1-1-2.1-13.
B. P. Lathi, "Modern Digital and Analog Communications Systems", Hoh, Rinehart and Winston, 1983, p. 224.
"Compatibility Aspects of HDTV," Kerns, H. Powers, RCA Laboratories, HDTV Colloquium sponsored by Canadian Government, Ottawa, Canada, Oct. 18-21, 1982, pp. 1.6-1-1.6-1.7.
M. Schwartz, "Information, Transmission, Modulation, and Noise", McGraw-Hill, 1980, pp. 244-250.
Roddy & Coolen, Electronic Communications, 2nd Edition, Reston Publishing Co., pp. 572-610.

"Universal Weighted Power Function of Television Noise and its Application to High Definition TV System Design," T. Fujio, SMPTE Journal, Vol. 89, No. 9, Sep., 1980.
G. M. Miller, "Modern Electronic Communication", 2nd Edition, Prentice-Hall, pp. 220-259.
"Transmission Primaries and Signal Forms," by T. Fujio and K. Kupota, NHK Technical Monograph No. 32, Jun. 1982.
"Compatible Systems for High-Quality Television", SMPTE J., R. N. Jackson and M. J. J. C. Annegarn, vol. 92, No. 7, pp. 719-723, Jul. 1983.
"Extended Definition Television with High Picture Quality", SMPTE J., B. Wendland, vol. 92, No. 10, pp. 1028-1035, Oct. 1983.

List Continued on next page.

Primary Examiner—John W. Shepperd
Assistant Examiner—Michael P. Dunnam
Attorney, Agent, or Firm—John C. Moran

[57] ABSTRACT

A television system having a fully compatible high-definition signal receivable at conventional resolution by conventional TV receivers and which is transmitted to the TV receivers by one TV channel carrying the conventional signal and a second TV channel carrying the high-frequency luminance and chrominance information. The high-frequency chrominance information is time compressed and transmitted during the horizontal retrace interval of the second TV channel. The baseband signal containing the high-frequency luminance components is derived from the lower sideband output of a product modulator whose inputs are taken from an anti-alias filtered (camera) source of wideband luminance information and a local oscillator. The phase of the local oscillator is transmitted to the TV receivers by a tone burst signal gated into the vertical retrace interval of the second channel. The high-frequency chrominance information comprises Q' and I' segments which are transmitted at alternate horizontal retrace intervals. The television receivers comprise memories which alternately store the transmitted Q' and I' segments. The storage of the received segments is done at a higher rate than the accessing of these segments thus a time expansion operation is performed by the memories. In addition, since the segments are alternately transmitted, a storage mechanism is provided so that a segment received on a previous horizontal horizontal line's active time for displaying both Q' and I' information.

16 Claims, 10 Drawing Figures

OTHER PUBLICATIONS

"Towards the Implementation of a Compatible HDTV System in North America," by C. W. Rhodes, High Definition TV Colloquium Post Conference Proceedings 1982, Ottawa, Ontario, Canada, Oct. 18–21, 1982, p. 1.5.

"The Problems and Promises of High-Definition Television", *IEEE Spectrum*, R. K. Jurgen, vol. 20, No. 12, pp. 46–51, Dec. 1983.

"An Evolutionary Approach to High Definition Television", in Proc. 16th Annual SMPTE Television Conference (*Tomorrow's Television*), C. W. Rhodes, pp. 186–197, Feb. 1982.

"A Compatible High Fidelity TV Standard for Satellite Broadcasting", in Proc. 16th Annual SMPTE Television Conference (*Tomorrow's Television*), T. W. Robson, pp. 218–236, Feb. 1982.

"High Definition Television Systems: Desirable Standards, Signal Forms, and Transmission Systems", *IEEE Trans. Comm.*, T. Fujio, vol. COM-29, No. 12, pp. 1882–1890, Dec. 1981.

"A Study of High-Definition TV System in the Future", T. Fujio, *IEEE Trans. on Brdcstg.* 12/78, vol. BC-24, No. 4, pp. 92–100.

"Present Situation of Japanese Satellite Broadcasting for Experimental Purpose", T. Ishida et al., *IEEE Trans. on Brdcstg.*, 12/79, vol. BC-25, No. 4, pp. 105–112.

"A Universal Weighted Power Function of Television Noise & Its Application to High Definition TV System Design", T. Fujio, *IEEE Trans. on Brdcstg.*, 6/80, vol. BC-26, No. 2, pp. 39–47.

"High-Definition Wide-Screen Television System for the Future-Present State of the Study of HD-TV Systems in Japan", T. Fujio, *IEEE Trans. on Brdcstg.*, 12/80, vol. BC-26, No. 4, pp. 113–124.

"The Future of High-Definition Television: First Portion of a Report of the SMPTE Study Group on High--Definition Television", Donald G. Fink, *SMPTE Journal*, 2/80, vol. 89, No. 2, pp. 89–94.

"The Future of High-Definition Television: Conclusion of a Report of the SMPTE Study Group on High--Definition Television", Donald G. Fink, *SMPTE Journal*, 3/80, vol. 89, No. 3, pp. 153–161.

"High-Definition Television System-Signal Standard and Transmission", T. Fujio, et al., *SMPTE Journal*, 8/80, vol. 89, No. 8, pp. 579–584.

Fibre Optic Analogue Transmission Experiment for High-Definition Television Signals Using Semiconductor Laser Diodes, Electronics Letters, Jul. 3, 1980, vol. 16, No. 14, pp. 536–538.

"Research and Development on High-Definition Television in Japan", K. Hayashi, *SMPTE Journal*, Mar. 1981, vol. 90, No. 3, pp. 178–186.

"Magnetic Recording of a High-Definition Television Signal", H. Abe, A. Nagura, H. Katayama, and H. Shibaya, *SMPTE Journal*, vol. 90, No. 3, Mar. 1981, pp. 192–195.

"High-Definition Television System-Signal Standards and Transmission", T. Fujio, et al., *IBC 80 International Broadcasting Convention*, Brighton UK, Sep. 20–23, 1980, pp. 14–18.

"Development Options for Future Television Systems", Prof. B. Wendland, *HDTV Committee Minutes* sponsored by *SMPTE*.

"High-Definition Television and Compatibility with Existing Standards", C. P. Sandbank and M. E. B. Moffat, *Tomorrow's Television* Conference, Nashville, Tennessee, Feb. 5–6, 1982.

"High-Definition Television Studies on Compatible Basis with Present Standards", Seminar 1982 sponsored by Department of Communication at University of Dortmund, West Germany, submitted by Prof. B. Wendland.

"Transients in Color Television", P. W. Howells, Proceedings of I-R-E, Jan. 1954, pp. 212–220.

"Transition Effects in Compatible Color Television", J. B. Chatten, Proceedings of the I-R-E, Jan. 1954, pp. 221–227.

"Reproduction of Luminance Detail by NTSC Color Television Systems", D. C. Livingston, Proceedings of the I-R-E, Jan. 1954, pp. 228–234.

"Selected Papers from the Proceedings of the National Television System Committee and its Panels", edited by Donald J. Fink, Television Standards and Practice, 1943.

"Time Frequency Multiplexing (TFM) of Two NTSC Color TV Signals-Simulation Results", B. G. Haskell, *Bell System Technical Journal*, vol. 60, No. 5, May–Jun. 1981, pp. 643–660.

"The New Mark VIII Automatic Colour Cameria", W. T. Underhill, Principles of Video Processing, pp. 12–16.

"Time Compression Multiplexing of Multiple Television Signals in Satellite Channels Using Chirp Transform Processors", Kai Y. Eng, et al., No. 12, 12/81, pp. 1832–1840.

TIME MULTIPLEXING CHROMINANCE INFORMATION FOR COMPATIBLE HIGH-DEFINITION TELEVISION

CROSS-REFERENCE TO RELATED APPLICATIONS

Concurrently filed herewith and assigned to the same assignees as this application is: T. S. Rzeszewski 2, "Single Sideband Modulated Chrominance Information For Fully Compatible High-Definition Television", Ser. No. 571,117.

The following U.S. application was filed on Jan. 28, 1983, and assigned to the same assignees as this application: T. S. Rzeszewski 1, "Fully Compatible High-Definition Television", Ser. No. 462,065 now abandoned.

TECHNICAL FIELD

This invention relates to a system for improving television picture quality and particularly to encoding and decoding facilities for use in a system that provides a color signal of improved quality to specially designed receivers and a signal of the usual quality to conventional receivers without alteration.

BACKGROUND OF THE INVENTION

It has long been recognized that the next evolutionary objective of television would be to provide high-definition television pictures to households throughout the United States. Two basic approaches have been put forward for achieving this next objective. The first approach is to depart from the present National Television System Committee standards (NTSC) and to utilize a new transmission protocol for providing high-definition television. The second approach is to provide high-definition television which could be received as a conventional television picture by conventional television receivers operating according to the NTSC standards or which could be received as a high-definition television picture by newly designed receivers without requiring prohibitively large amounts of bandwidth.

The article entitled "Transmission Primaries and Signal Forms" by T. Fugio and K. Kupota, *NHK TECHNICAL MONOGRAPH*, No 32, June 1982, describes a system according to the first approach and notes that two different signal forms have been proposed for high-definition television signal if the first approach is to be used. One is a composite system in which the transmission of the luminance and chrominance signals are frequency-division multiplexed in their spatial and temporal frequency domains as in conventional television signals and a second system in which the luminance and chrominance information is time-division multiplexed every one or two line scan periods. The composite system would have problems with the cross-luminance and cross-color effects particularly when motion or diagonal patterns were present in the television picture. The article concludes that the time-division multiplexed system would not be troubled with these effects but that this system is most suitable for FM transmission or for magnetic video recording. The opinion that the time division multiplexed technique is most suitable for FM modulation or magnetic video recording is also set forth in the article entitled "Towards the Implementation of a Compatible HDTV system in North America" by C. W. Rhodes, High Definition TV Colloquium Post Conference Proceedings 1982, Ottawa, Ontario, Canada, Oct. 18–21, 1982, p. 1.5.

A system using the second approach is disclosed in the above-identified application of T. S. Rzeszewski 1, "Fully Compatible High-Definition Television", Ser. No. 462,065. In that system, one television channel carries the conventional television information while high-frequency luminance and high-frequency chrominance information are provided for in a second television channel. In that system, the Q' and I' portions which represent the high-frequency chrominance information are time multiplexed to the receiver among successive horizontal lines of the picture. Cross-luminance and cross-color effects are reduced by modulating the multiplexed color signals with a multiple of the horizontal sweep frequency to provide a single sideband spectrum that interleaves in a non-interfering manner with the luminance spectrum that is modulated at an odd multiple of one quarter the horizontal sweep frequency. Whereas this method reduces the cross-luminance and cross-color effects, motion or diagonal patterns in the television picture will cause these effects to appear. It is known in the art to use expensive comb filters to further reduce but not eliminate these effects.

Whereas, the use of FM transmission for high-definition television is of interest for a totally new system, it does not allow compatibility with conventional television receivers as illustrated by Fugio and Rhodes. Even in a system with compatibility, there exists a need for a system which can provide high-definition chrominance information with minimal cross-luminance and cross-color effects while still maintaining compatibility with conventional television receivers.

SUMMARY OF THE INVENTION

The foregoing problems are solved and a technical advance is achieved in accordance with the principles of this invention incorporated in an illustrative method and structural embodiment in which high-definition television picture signals with improved chrominance information are provided which can be received on conventional unmodified television sets and which can be received on modified receivers by the utilization of two conventional broadcast television channels. The conventional television signal is transmitted in one channel, and the other channel communicates the high-frequency luminance and chrominance information. Advantageously, the high-frequency chrominance information is time compressed and transmitted during the horizontal retrace interval of the other television channel relying on the conventional television channel to provide the necessary horizontal synchronization information for both television channels. By utilizing the horizontal retrace interval for communication of the high-frequency chrominance information, the cross-luminance and cross-color effects are avoided.

Advantageously, a television receiver designed in accordance with my invention decodes the conventional chrominance information using standard techniques. However, that receiver is responsive to the compressed high-frequency chrominance information in the high-definition video signal to gate the compressed high-frequency chrominance information to facilities which performs a time expansion of the compressed high-frequency chrominance information. The receiver then combines the conventional chrominance information and the high-frequency chrominance information for purposes of display.

In addition, the high-frequency chrominance information comprises Q' and I' segments in alternate horizontal retrace intervals, and the expansion circuit has two memories. The memories alternately store transmitted chrominance information during horizontal retrace intervals and access the stored information on the next horizontal retrace interval. The storing is done at a higher rate than the accessing thereby accomplishing the time expansion operation. Since the I' and Q' segments are alternately stored, the receiver provides a storage mechanism for storing the segment read out of one of the memories on a previous interval so that this segment can be reutilized with a present readout segment during the present horizontal information interval.

Advantageously, high-frequency chrominance information and high-frequency luminance information from a high-resolution TV camera are encoded into the other television channel by the modulation of the high-frequency luminance information and the inclusion of the high-luminance frequency chrominance information into the horizontal retrace interval. The conventional chrominance and luminance information are encoded into conventional television channel. The high-frequency chrominance information is first filtered from the high-definition chrominance information from the high-resolution camera and then time compressed so as to occupy the amount of time available during the horizontal retrace interval. After the high-frequency chrominance information has been time compressed, it is then gated into the horizontal retrace interval of the second channel by a gating circuit.

The novel method is provided for encoding high-definition chrominance information from a high-definition video camera into conventional chrominance information communicated in a first TV channel and high-frequency chrominance and luminance information communicated in a second TV channel. The steps involve time compressing the high-frequency chrominance information, gating the compressed high-frequency chrominance information into the horizontal retrace interval of the second TV channel, and transmitting the first TV channel and the second channel to TV receivers.

At the receivers, the method provides for decoding the first and second channels by the following steps: decoding conventional chrominance information from the first channel, gating the compressed high-frequency information from the second channel, expanding the gated high-frequency information, and adding the expanded high-frequency information and decoded conventional chrominance information for display.

My invention particularly pertains to high-definition signal encoding and decoding circuitry illustratively embodied in video signal processing, or transmitting, locations and in TV receivers for high-definition picture display.

BRIEF DESCRIPTION OF THE DRAWING

In general, system elements, when first introduced on a figure, are each designated with a number that uses the figure number as the most significant digits of the element number.

GENERAL DESCRIPTION

Figure 1:
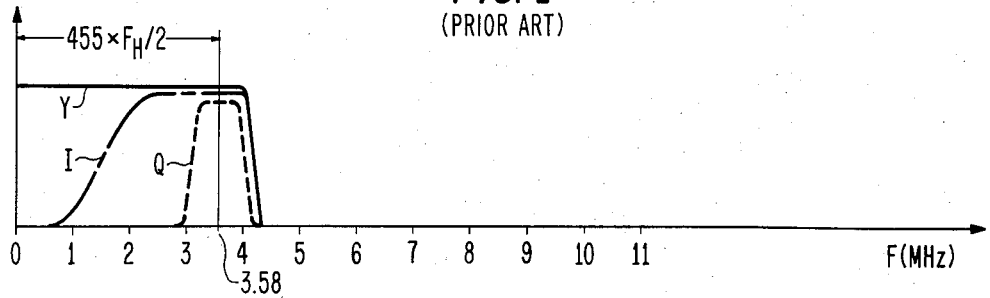
FIG. 1 shows the amplitude-frequency characteristics of the conventional baseband video signal.

FIG. 1 shows the nominal baseband amplitude-frequency characteristics of the video signal at the transmitter in the conventional NTSC system. The frequency of the chrominance subcarrier, $F_{sc}$, is displaced by the 455th harmonic of half the horizontal line-scanning frequency $F_H$ from the origin. This relationship was chosen to take advantage of the fact that the luminance spectra, Y, is actually not continuous (as shown) but exists as a multiplicity of groups of signals (not shown) centered about harmonics of the line-scanning frequency, $F_H$. The chrominance subcarrier $F_{sc}$ is set at a frequency which is an odd harmonic of half the line scanning frequency, so as to lie in a valley between two of such signal groups The chrominance subcarrie $F_{sc}$ is conventionally quadrature amplitude modulated by two chroma signals designated I and Q in FIG. 1. The Q-chroma signal reproduces colors from yellow-green to purple, while the I-chroma signal transmits hues ranging from bluish-green (cyan) to orange. The I-chroma signal contains both double sideband and single sideband portions. The double sideband portion extends 0.5 megahertz (MHz) on either side of the in-phase chrominance subcarrier. The single sideband portion extends from 0.5 to 1.5 MHz below the in-phase chrominance subcarrier. The narrow band Q-chroma signal is double sidebanded, extending 0.5 MHz either side of the quadrature chrominance subcarrier.

While FIG. 1 shows the nominal baseband amplitude-frequency characteristic at the transmitter, many contemporary TV receivers do not use the full bandwidth of the I-chroma spectrum and instead confine their demodulation to hardly more than the 1 MHz bandwidth encompassing the double-sideband portions of the I and Q signals.

Figure 2:
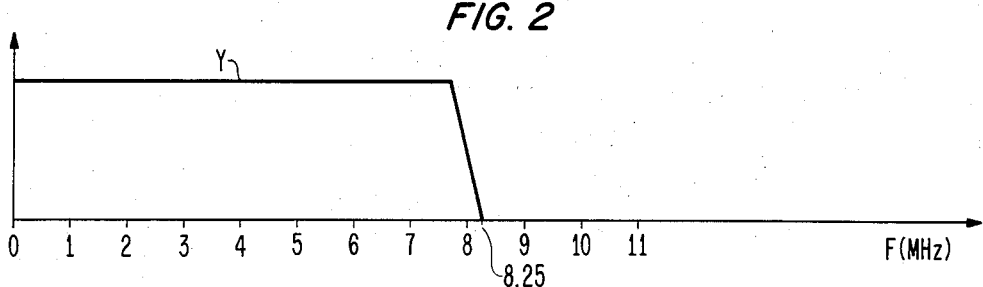
FIG. 2 shows the baseband amplitude-frequency characteristics of a wideband video source.

In FIG. 2, the baseband amplitude-frequency characteristic of a wideband video source having an illustrative luminance bandwidth of 8.25 MHz (adequate to provide a horizontal resolution of 660 lines) is shown. This broadened baseband source is assumed to be provided by improved camera technology as heretofore mentioned. The required bandwidth is determined by the degree of improved horizontal resolution desired. Resolution is usually expressed in terms of vertical resolution and horizontal resolution. The vertical resolution tells the number of horizontal lines alternating between black and white that can be resolved in the TV image. The horizontal resolution of a system can be expressed in terms of (vertical) lines that are of the same width as the horizontal lines used to determine the vertical resolution. Since a cycle of horizontal bandwidth (half the horizontal line white, half black) contains the information equivalent of two vertical lines, the width of the lines must be adjusted to be the same as for vertical resolution taking the 4 to 3 aspect ratio into account. The horizontal resolution per unit of video bandwidth is, therefore, determined by multiplying the effective horizontal line time by two and dividing by the aspect ratio. In the NTSC system, the effective horizontal line time is 53.5 USEC and the aspect ratio is 4/3. Accordingly, the horizontal resolution of the NTSC system may be expressed as approximately 80 lines/MHz. Most NTSC receivers have about 3 MHz of bandwidth that results in 240 lines of resolution. The 8.25 MHz source bandwidth will permit 660 lines of horizontal resolution to be achieved.

Figure 3:
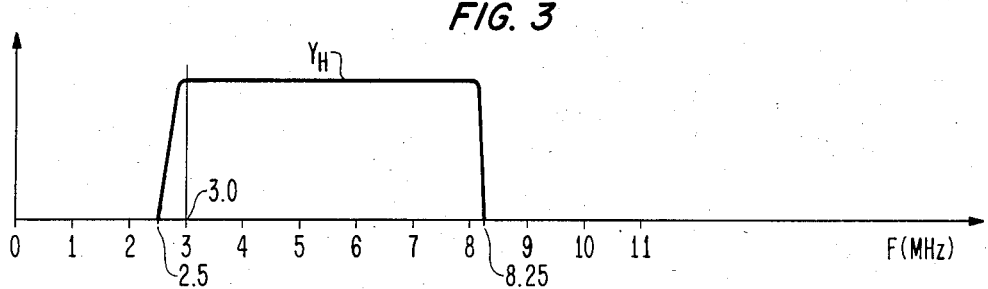
FIG. 3 shows the results of high-pass filtering the amplitude-frequency characteristic of FIG. 2.
Figure 4:
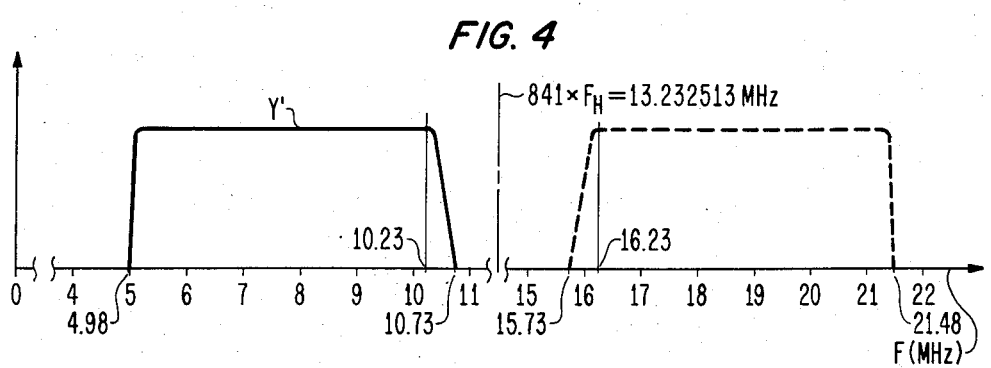
FIG. 4 shows the two sidebands produced by modulating the signal of FIG. 3.

The wideband luminance source signal of FIG. 2 is presented both to a conventional (NTSC) encoder and to a high-pass filter. The NTSC encoder accepts the lower 4.2 MHz of the 8.25 MHz luminance signal as shown in FIG. 1. The high-pass filter, having a cutoff frequency of approximately 3 MHz presents a luminance output, $Y_H$ shown in FIG. 3. The luminance output $Y_H$ is delivered to a modulator, advantageously of the "product" type having a local oscillator whose frequency is set at 841 times $F_H$. The modulator output contains the upper and lower sideband signals shown in FIG. 4. The upper sideband of FIG. 4 is discarded and the lower sideband is added to the conventional NTSC portion to yield the composite baseband amplitude-frequency characteristics shown in FIG. 5.

Figure 5:
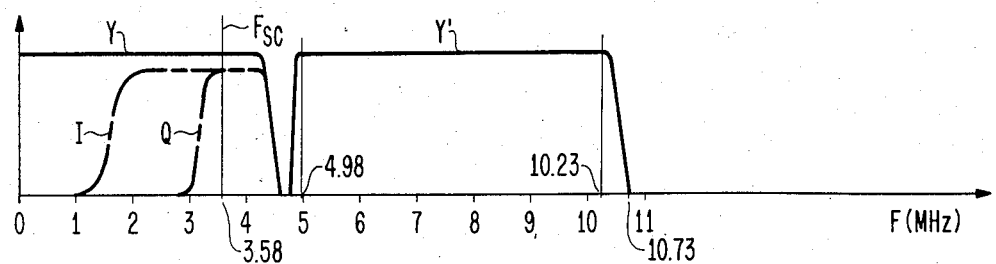
FIG. 5 shows a composite baseband amplitude-frequency characteristic containing the conventional (NTSC) portion of FIG. 1 and the lower sideband portion of FIG. 4.
Figure 6:
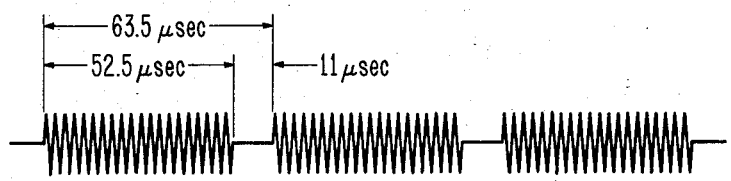
FIG. 6, a time domain illustration of Y', shows the time ratio of the horizontal retrace interval to horizontal information interval for a conventional television signal.
Figure 7:
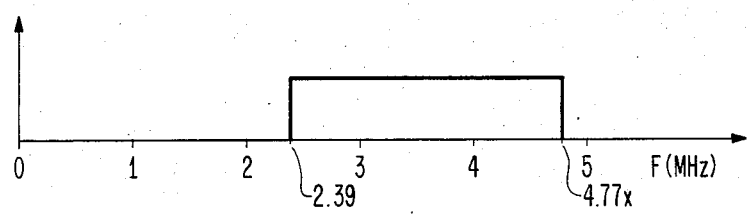
FIG. 7 shows the frequency spectrum of the additional chrominance information to be transmitted during the horizontal retrace interval.
Figure 8:
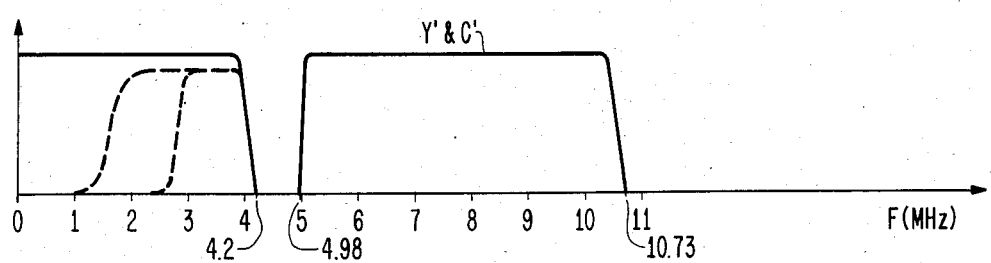
FIG. 8 shows the composite baseband amplitude-frequency characteristic including the multiplexed high-frequency chrominance signals.

In addition to the conventional NTSC chrominance information illustrated in FIG. 5, chrominance information, C', is also transmitted during the horizontal retrace interval of the second channel illustrated in FIG. 5. The additional chrominance information can be transmitted during the horizontal interval in the second channel (Y') since the necessary horizontal sync pulse and color burst information are transmitted in the first channel as part of the standard NTSC signals. The chrominance information from 0 to 0.5 MHz is communicated from the transmitter to the receiver as part of the standard NTSC chrominance information, $C_L$. The chrominance information from 0.5 to 1.7 MHz is time compressed from 52.5 USEC to 11 USEC and transmitted during the horizontal interval. The additional chrominance information, C', consists of the I' and Q' signals communicated in a time multiplexed manner. During any given horizontal blanking interval, the C' information consists of either Q' or I' with the other component being transmitted in the next horizontal blanking interval. FIG. 6 illustrates the time compression which must be implemented. The 52.5 USEC represents the transmission of the active video time whereas the 11 USEC region represents the horizontal blanking interval. Normally, the C' information would be transmitted over the 52.5 USEC interval, and now, this information must be compressed down into 11 USEC. The time compression ratio is 52.5/11 = 4.77. FIG. 7 illustrates the resulting frequency expansion that results. The low frequency that corresponds to 0.5 MHz becomes 0.5 × 4.77 = 2.39 MHz, and the highest frequency that determines the chrominance bandwidth is 4.77X where X is found in the following manner. From FIG. 5, it can be seen that the maximum bandwidth for the second channel is 10.75 − 5 = 5.75 MHz in order to stay within 12 MHz when vestigial sideband AM modulation is used for broadcast. From FIG. 7, then it can be determined that the maximum bandwidth available for the C' signal is given by the following formula: 5.75 MHz = 4.77X − 2.39 MHz. From this formula, X is calculated to be 1.7 MHz. Therefore, the chrominance bandwidth capability of this system is 1.7 MHz. The resulting information transmitted from the transmitter to the receiver is illustrated in FIG. 8.

DETAILED DESCRIPTION

Figure 9:
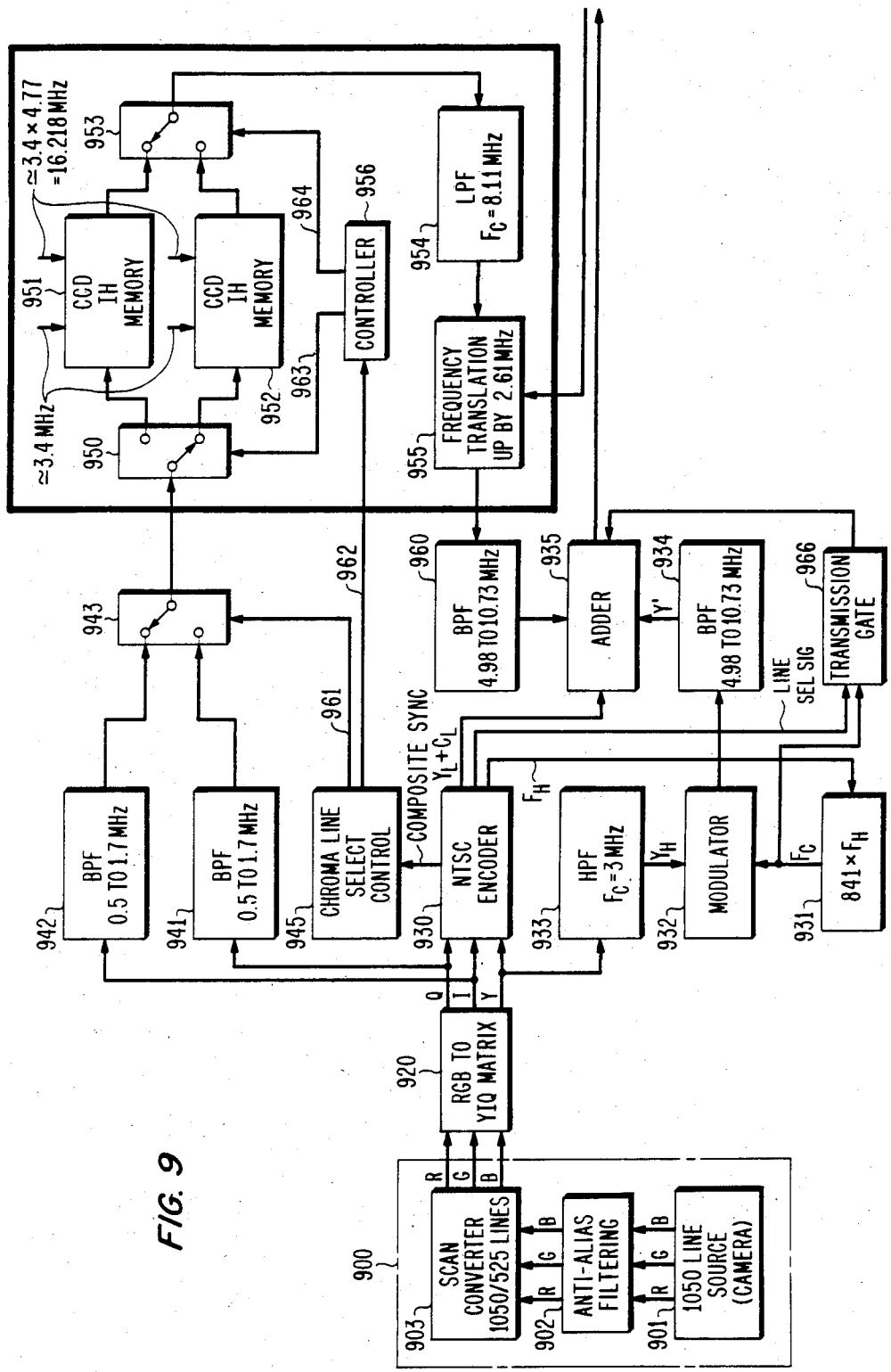
FIG. 9 is a block diagram of the high-definition encoder of my invention.

Referring now to FIG. 9, a block diagram of the enhanced resolution TV modulator is described. The increased bandwidth baseband signal of FIG. 2 is provided by circuit 900. Circuit 900 advantageously may be of the type described in the article "Concepts For A Compatible HIFI-Television System" by B. Wendland in *NTG-Fachber*, (Germany), Vol. 7, September, 1980, at pp. 407–416. That article described an improved video source camera 901 capable of providing an output having more than the conventional number of scanning lines. Illustratively, camera 901 capable of functioning as a 1050 line source of wideband red, green and blue signals, R, G, B, is provided. The wideband R, G, B signals from camera 901 are then subjected to anti-alias filtering by circuit 902 to remove frequency components above the Nyquist rate.

Figure 10:
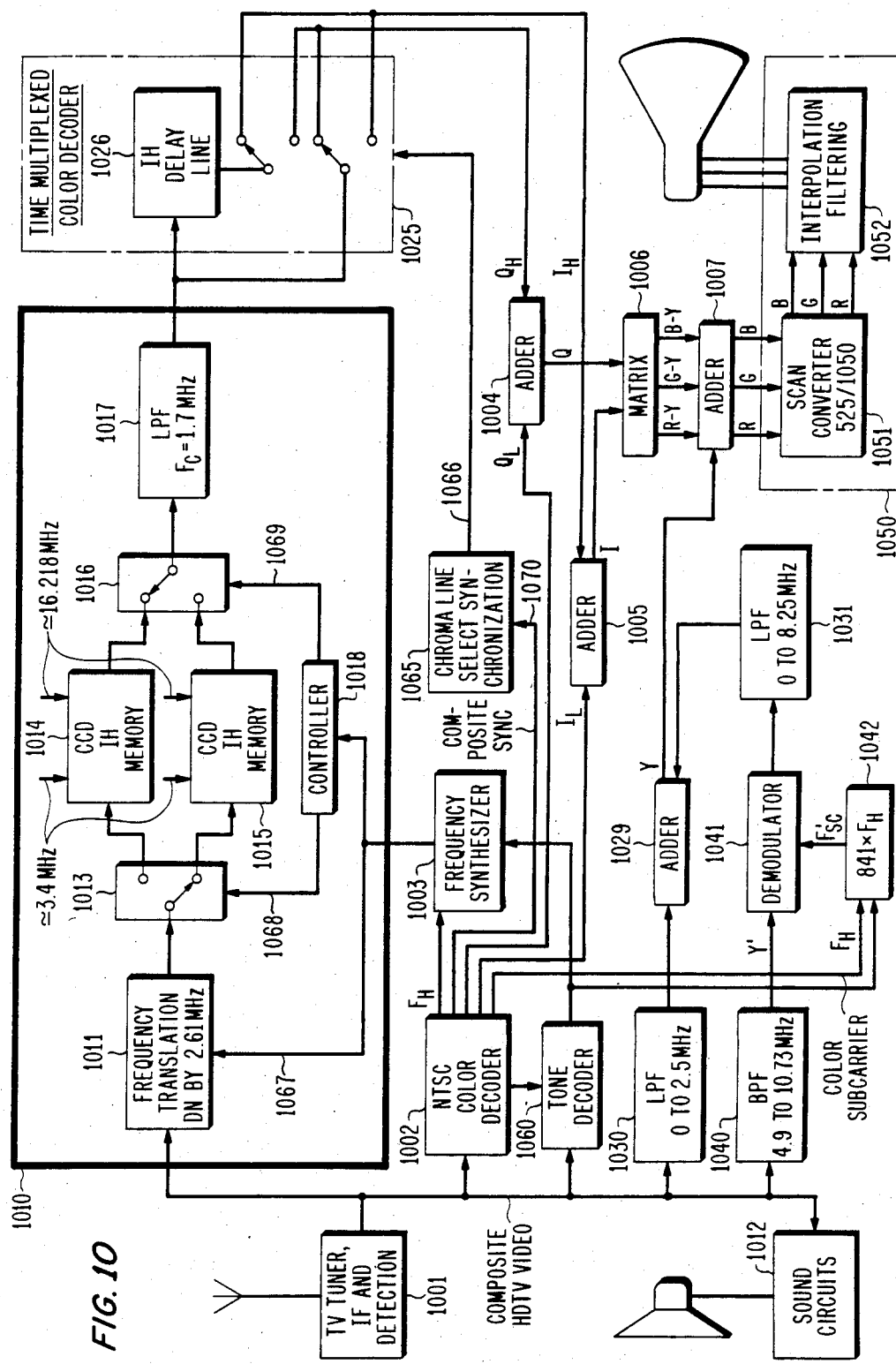
FIG. 10 is a block diagram of the high-definition decoder of my invention.

Because the scanning process that changes the image into an electrical signal in the camera and then reassembles the image on the picture tube is really a sampling process, the vertical resolution is usually determined by reducing the effective number of scan lines (the total number less the number of lines in the vertical blanking interval) by the "Kell factor" of 0.6 to 0.7. Vertical filtering of the camera/source signal, however, reduces the effects of aliasing and provides a Kell factor approaching unity so that a vertical resolution approaching 483 lines, (525−2×21) is achieved. The point spread function (PSF) of the camera and the display are analogous to the impulse response in linear circuit theory and are usually adjusted by shaping the electron beam. However, a narrow PSF in the vertical direction means a wide frequency spectrum and aliasing, and a wide PSF means overlapping of adjacent lines and low-pass filtering in the vertical direction (defocusing). In the NTSC system, the PSF is adjusted to compromise between aliasing and defocusing. Anti-aliasing (prefiltering) is employed in circuit 900 of the coder apparatus of FIG. 9 and interpolation (post filtering) is employed at the corresponding circuit 1050 decoder apparatus of the receiver, (FIG. 10).

In circuit 900, the anti-alias filtered camera signals are applied by circuit 902 to scan converter 903. Scan converter 903 deletes every second line of each of the 1050 line R, G, B signals to obtain a 525 line signal for ultimate transmission that will be compatible with the baseband of existing (NTSC) television receivers. The wideband R, G, B signals at the output of scan converter 903 are applied to the RGB-to-YIQ conversion matrix 920. Because of the wideband input of the R, G, B signals, the luminance output Y of conversion matrix 920 exhibits the wideband amplitude-frequency characteristics of FIG. 2.

NTSC encoder 930 receives the Y, I, Q output of matrix 920 and provides conventional luminance and chrominance output signals, $Y_L+C_L$, to adder 935, a composite sync signal to circuit 945, and the conventional NTSC horizontal frequency signal $F_H$ to circuit 931. In the absence of any other input, the output of adder 935 would simply provide a conventional NTSC baseband signal to the final video modulator stage (not shown) which would radiate a signal in a designated TV channel according to the frequency of the video carrier selected. However, adder 935 is provided with two additional inputs C' and Y' to be described, which are transmitted by a final modulator stage (not shown) on the second of two designated TV channels. These two channels should preferably be adjacent channels to minimize the effects of weather, however, more widely separated channels may also be employed.

Circuit 931 receives the horizontal signal $F_H$ and serves as a local oscillator for a modulator 932. The frequency of the local oscillator output is advantageously chosen to be 841 the frequency of the horizont $F_H$. In the NTSC system, where the horizontal frequency is 15.73426 KHz, the local oscillator frequency $F_c$, provided by circuit 931 to modulator 932 would be approximately 13.23 MHz The other signal that is input to modulator 932 is the upper portion of the wideband luminance signal, $Y_H$ that is taken from the Y signal output of matrix 920 after being filtered by high-pass filter 933. Filter 933 is advantageously chosen to have a cross-over frequency of approximately 3 MHz.

The output of modulator 932 contains the two sidebands shown in FIG. 4. The upper sideband is suppressed in band-pass filter 934 and the lower sideband Y' is passed to adder 935. The combination in adder 935 of the conventional signals $Y_L+C_L$ from NTSC encoder 930 with the wideband luminance signal Y' from filter 934 yields a baseband output signal having the amplitude-frequency characteristic of FIG. 5. This amplitude-frequency characteristic is capable of providing a high definition image within a signal spectrum requiring not more than two conventional (6 MHz) video channels.

The definition of the high-frequency chrominance components of the video signal are enhanced in the following manner. The Q and I outputs of conversion matrix 920 are, respectively, delivered to band-pass filters 941 and 942 which limit each chrominance component to a 1.2 MHz bandwidth extending from 0.5 to 1.7 MHz. The band-limited outputs of filters 941 and 942 are each sampled on alternate horizontal lines by the color multiplexer 943 under the control of line selection circuit 945. Line selection circuit 945 receives the composite sync output of NTSC encoder 930 and controls color multiplexer via conductor 961 943, advantageously by counting the sync pulses, so that each new field starts its first line from the I signal output of filter 942.

After the high-frequency chrominance components, I' and Q', are alternately selected by color multiplexer 943, the latter applies those components to multiplexer 950. The information received from multiplexer 943 is alternately stored in CCD memories 951 and 952 under control of controller 956 and multiplexer 950. One entire line of chrominance information is being stored in one of the CCD memories while the contents of the other CCD memory is being transferred out through multiplexer 953. Controller 956 may advantageously comprise a bi-stable device whose outputs are connected to conductors 963 and 964. Controller 956 is responsive to a signal indicating the start of the horizontal retrace interval received via conductor 962 from chroma line select control 945. Controller 956 controls the writing and the reading of memories 951 and 952 by signals transmitted via conductors 963 and 964 to multiplexers 950 and 953, respectively. Chrominance information is stored in the CCD memories at a 3.4 MHz rate and removed from the CCD memories at a 16.218 MHz rate thus performing the time compression necessary to compress the chrominance information from the active video time (53.5 USEC) to horizontal interval time (11 USEC).

Once the chrominance information has been read out from the selected CCD memory by multiplexer 953, the chrominance information is passed through low pass filter 954 to remove unwanted high-frequency signals that were produced by the sampling processes in the CCD memory. The output of low pass filter 954 is then frequency shifted by frequency translation circuit 955 so that it falls within the frequency range of 4.98 MHz to 10.73 MHz.

The high-frequency multiplex chrominance components at the output of frequency translation circuit 955 are applied to bandpass filter 960 to eliminate any additional unwanted frequencies that may be generated by the frequency translation process. The output, C', of filter 960 is applied to one input of adder 935. Since the other inputs of adder 935 are the conventional NTSC baseband signal and the high-frequency luminance, Y' the output of adder 935 provides the composite baseband signal of FIG. 8.

Compatibility with existing receivers is immediately apparent because the lower portion of the composite signal (FIG. 8) may be decoded by conventional NTSC receiver circuitry. However, using an improved decoder both the conventional NTSC spectrum as well as the high wideband amplitude-frequency characteristics are decoded.

During the vertical interval, transmission gate 966 is responsive to a signal from encoder 930 to gate a burst of one half the frequency of the $F_C$ signal to adder 935 for transmission to the receiver. Tone decoder 1060 as illustrated in FIG. 10 is responsive to this tone burst to synchronize the phase of the $F'_{sc}$ signal to $F_C$ signal shown in FIG. 9.

An improved decoder is shown in FIG. 10. RF tuner, video detector and IF stage 1001 receives the incoming TV signal, i.e., the two TV channels containing the broadband luminance and chrominance information heretofore described. Accordingly, stage 1001 may contain either a broadband RF tuner capable of receiving two adjacent TV channels or separate RF tuners each tuned to a respective channel. In either event, the output of stage 1001 provides the baseband amplitude-frequency characteristic of FIG. 8. Stage 1001 is coupled at its output to circuits 1002, 1011, 1012, 1030, 1040, and 1060.

NTSC color decoder 1002 receives the broadband signal of FIG. 8 from stage 1001 and at its output provides the conventional (narrowband) Q and I chrominance signals designated, $Q_L$ and $I_L$ to adders 1004 and 1005, respectively. Adders 1004 and 1005 combine the conventional Q and I chrominance signal with the high frequency chrominance signals that are derived from stage 1001 by the tandem arrangement of circuit 1010 and time multiplex color decoder 1025.

During each horizontal retrace interval, frequency translation circuit 1011 is responsive to the C' chrominance information to translate the frequency of the C' information down by 2.61 MHz so that it occupies the proper frequency with respect to the standard NTSC chrominance information, C. During the horizontal retrace interval, multiplexer 1013 is responsive to the output of frequency translation circuit 1011 to store this information in either CCD memory 1014 or 1015. The CCD memory which is empty at that point in time will be chosen to receive the information from circuit 1011. The information from 1011 is stored at 16.218 MHz and read out of the memories at 3.4 MHz thereby performing a time expansion operation on the C' information. One of the CCD memories is always actively being read out by multiplexer 1016 under control of controller 1018 while the other CCD memory is being filled via multiplexer 1013. Controller 1018 may advantageously comprise a bi-stable device, whose outputs are connected to conductors 1068 and 1069 and which is responsive to a gating signal indicating the start of the horizontal retrace interval received via conductor 1067 from frequency synthesizer 1103 to control the writing and reading of memoris 1013 and 1014 by signals transmitted via conductors 1068 and 1069 to multiplexers 1013 and 1016, respectively. Frequency translation device 1011 also utilizes the gating signal transmitted via conductor 1067 to gate the high-frequency chroma information received during the retrace interval to multiplexer 1013.

Low pass filter 1017 is responsive to the output of multiplexer 1016 to filter out all the undesired frequencies above 1.7 MHz. The output of low pass filter 1017 is transmitted to time multiplex control decoder 1025. The signals transmitted from low pass filter 1017 are in time-multiplex form. The multiplexer 1025 operates upon these multiplex signals and provides continuous I' and Q' signals to adders 1004 and 1005, respectively. In multiplexer 1025, delay line 1026 provides for one horizontal line of color information storage so that the present lines I(Q) signal and the previous lines Q(I) signal, stored in delay line 1026 can be simultaneously presented to adders 1005 and 1004. This multiplexing is done under control of the chroma line select synchronization circuit 1065 by multiplexer 1025 responding to a control signal transmitted via conductor 1066. Chroma line select synchronization circuit 1065 is responsive to the composite sync signal received via conductor 1070 from NTSC color decoder 1002 to generate the signal transmitted on conductor 1066. The composite I and Q signals at the outputs of adders 1005 and 1004 are applied to conversion matrix 1006 which produces wideband output R-Y, G-Y, and B-Y outputs to adder 1007.

A high frequency luminance input, Y, to adder 1007 is provided from adder 1029 which receives as inputs the outputs of low pass filters 1030 and 1031. Filter 1030 constrains the composite wideband video signal provided by stage 1001 to the region 0 to 2.5 MHz. Low pass filter 1031 delivers the lower sideband output, 2.5 to 8.25 MHz, provided by product demodulator 1041. Product demodulator 1041 receives a local oscillator input, $F'_{sc}$, from circuit 1042 that is 841 times the horizontal frequenc $F_H$ detected by NTSC color decoder 1002. The other input to product demodulator 1041 is the upper portion of the baseband video signal extending from approximately 4.98 to 10.73 MHz as shown in FIG. 8. The circuit 1042 synchronizes the phase of the $F'_{sc}$ signal to the phase of the $F_C$ signal of FIG. 9 in response to a phase signal from tone decoder 1060. The latter generates the phase signal by decoding a tone burst transmitted during the vertical retrace interval via transmission gate 966 of FIG. 9.

The composite high resolution R, G, and B signals provided at the output of adder 1007 are delivered to output circuit 1050 which includes a 525-to-1050 line scan converter 1051 and an interpolating filter circuit 1052. The interpolated R, G, and B signals from circuit 1052 are then available to be displayed on the TV screen of the receiver.

While the illustrative embodiments of my invention have been described specifically with relation to NTSC standards and protocols, it is to be understood that principles of my invention are applicable to other standards and protocols, such as PAL. Furthermore, the circuits and amplitude characteristics which have been described are deemed to be illustrative of the principles of my invention. Numerous modifications may be made by those skilled in the art without departing from the spirit and scope of my invention. In particular, it would be obvious to one skilled in the art to use the I bandwidth available in the NTSC signal to transmit both the low and high-frequency I signals and to use the horizontal interval of Y' to transmit only the high-frequency Q signal thus increasing the overall chrominance bandwidth.

What is claimed is:

1. A system for decoding high-definition chrominance information of a high-definition baseband video signal having a first baseband signal including low-frequency chrominance information and second baseband signal including high-frequency chrominance information compressed into the horizontal retrace interval of said second baseband signal, said system comprises
   means for decoding said low-frequency chrominance information;
   means for gating said compressed high-frequency chrominance information from said second baseband signal;
   means for expanding the gated compressed high-frequency chrominance information; and
   means for adding the decoded low-frequency chrominance information and the expanded high-frequency chrominance information to produce said high-definition chrominance information.

2. The system of claim 1 wherein said high-frequency chrominance information comprises a first and a second type of chrominance information on alternate horizontal intervals and said expanding means comprises
   first means for storing said first type of information during a first horizontal interval;
   second means for storing said second type of information during a second horizontal interval;
   means for reading said first type of information from said first storing means during said second horizontal interval; and
   said reading means further comprises means for reading said second type of information during a third horizontal interval.

3. The system of claim 2 further comprises
   third means for storing the read first type of information during said second horizontal interval; and
   means for multiplexing said read first type of information from said third means and the read second type of information for transmission to said adding means.

4. The system of claim 1 wherein said first storing means comprises a charge-coupled device memory comprising means for storing said first type of information at a predefined rate which is faster than the rate at which said reading means reads said first type information, thereby performing a time expansion operation on said first type of information.

5. The system of claim 4 wherein said compressed high-frequency chrominance information is frequency shifted for transmission in said second baseband signal and said expanding means further comprises means for translating said compressed high-frequency chrominance information in frequency.

6. A system for encoding high-definition chrominance information from a high-definition video source into low-frequency chrominance information encoded into a first baseband signal and high-frequency chrominance information encoded into second baseband signal for transmission, said system comprises
   means for encoding said low-frequency chrominance information into said first baseband signal;
   means for filtering said high-frequency chrominance information from said high-definition chrominance information;
   means for time compressing said high-frequency chrominance information;
   means for gating the compressed high-frequency chrominance information into a horizontal retrace interval of said second baseband signal; and
   means for transmitting the encoded first baseband signal and said second baseband signal including the gated compressed high-frequency chrominance information in said horizontal retrace interval thereof.

7. The system of claim 6 wherein said compressing means comprises a plurality of means for alternately storing high-frequency chrominance information on a horizontal information interval basis; and
   means for alternately reading the stored high-frequency chrominance information from one of said plurality of storing means during one of a plurality of horizontal retrace intervals.

8. The system of claim 7 wherein said storing means comprises charge-coupled memories in which said high-frequency chrominance information is stored at a predefined rate and from which said reading means reads said high-frequency chrominance information at a rate greater than said predefined rate thereby performing a time compression operation.

9. The system of claim 8 wherein said high-frequency chrominance information comprises a first and a second type of chrominance information, and said system further comprises multiplexing means for alternately selecting on the basis of horizontal information intervals the first and second types of information for storage in said plurality of storing means such that said first type of information is transmitted to said television receiver during said horizontal retrace interval and said second type of chrominance information is transmitted to said television receiver during another horizontal retrace interval.

10. The system of claim 9 wherein said compressing means further comprises means for frequency translating the compressed high-frequency information.

11. A method for decoding high-definition chrominance information of a high-definition baseband video signal having a first baseband signal including low-frequency chrominance information and second baseband signal including high-frequency chrominance information compressed into the horizontal, retrace interval of said second baseband signal, comprising the steps of:
   decoding said low-frequency chrominance information;
   gating said compressed high-frequency chrominance information from said second baseband signal;
   expanding the gated compressed high-frequency chrominance information; and
   adding the decoded low-frequency chrominance information and the expanded high-frequency chrominance information to produce said high-definition chrominance information.

12. The method of claim 11 wherein said high-frequency chrominance information comprises a first and a second type of chrominance information on alternate horizontal intervals and said expanding step comprises the steps of:
   storing said first type of information during a first horizontal interval;
   storing said second type of information during a second horizontal interval;
   reading said first type of information from said first storing means during said second horizontal interval; and
   said reading step further comprises the step of reading said second type of information during a third horizontal interval.

13. A method for encoding high-definition chrominance information from a high-definition video source into low-frequency chrominance information encoded into a first baseband signal and high-frequency chrominance information encoded into second baseband signal for transmission, comprising the steps of:
   encoding said low-frequency chrominance information into said first baseband signal;
   filtering said high-frequency chrominance information from said high-definition chrominance information;
   time compressing said high-frequency chrominance information;
   gating the compressed high-frequency chrominance information into a horizontal retrace interval of said second baseband signal; and
   transmitting the encoded baseband signal and said second baseband signal including the gated compressed high-frequency chrominance information in said horizontal retrace interval thereof.

14. A plural channel system for transmission of high-definition video information, said system comprising
   means for generating said high-definition video information having low-frequency luminance and chrominance information and high-frequency luminance and chrominance information;
   means responsive to said high-definition video information for encoding said low-frequency luminance and chrominance information into a first one of said plural channels;
   means responsive to said high-definition video information for encoding said high-frequency luminance information into a second one of said plural channels;
   means responsive to said high-definition video information for time compressing said high-frequency chrominance information;
   means responsive to the compressed high-frequency chrominance information for gating the latter into the horizontal retrace interval of said second one of said plural channels; and
   means for adding said first one and second one of said plural channels for transmission.

15. The system of claim 14 wherein said high-frequency luminance encoding means comprises means for modulating said high-frequency luminance information with a signal having a frequency that is a multiple of the frequency of the chrominance subcarrier used to encoded said low-frequency chrominance information to produce a sideband signal having spectra that do not overlap the spectra of said encoded low-frequency luminance and chrominance information.

16. A system for displaying high-definition video information of a high-definition baseband video signal having a first baseband signal including low-frequency luminance and chrominance information and second baseband signal including high-frequency luminance encoded as a luminance single sideband signal and high-frequency chrominance information compressed into the horizontal retrace interval of said second baseband signal, said system comprises means for expanding said compressed chrominance information to produce said high-frequency chrominance information;

means responsive to said luminance single sideband signal of said second baseband signal for decoding said high-frequency luminance information;

means responsive to said first baseband signal for generating said low-frequency luminance information;

means responsive to said first baseband signal for recreating said low-frequency chrominance information;

means for adding the expanded chrominance information and the recreated chrominance information to produce a composite chrominance signal;

means for adding the decoded luminance information and generated luminance information to produce a composite luminance signal; and means for displaying said composite chrominance signal and said composite luminance signal.

* * * * *